US011255364B2

(12) United States Patent
Phillips

(10) Patent No.: US 11,255,364 B2
(45) Date of Patent: Feb. 22, 2022

(54) CONNECTOR ASSEMBLY

(71) Applicant: Ovvotech Innovations Limited, Newry (GB)

(72) Inventor: Donal Phillips, Newry (GB)

(73) Assignee: Ovvotech Innovations Limited, County Down (GB)

( * ) Notice: Subject to any disclaimer, the term of this patent is extended or adjusted under 35 U.S.C. 154(b) by 456 days.

(21) Appl. No.: 16/320,467

(22) PCT Filed: Jul. 24, 2017

(86) PCT No.: PCT/EP2017/068590
§ 371 (c)(1),
(2) Date: Jan. 24, 2019

(87) PCT Pub. No.: WO2018/019752
PCT Pub. Date: Feb. 1, 2018

(65) Prior Publication Data
US 2019/0271347 A1 Sep. 5, 2019

(51) Int. Cl.
*F16B 12/26* (2006.01)
*F16B 12/38* (2006.01)
(Continued)

(52) U.S. Cl.
CPC .............. *F16B 12/26* (2013.01); *F16B 12/38* (2013.01); *F16B 12/24* (2013.01); *F16B 12/36* (2013.01)

(58) Field of Classification Search
CPC .......... F16B 12/24; F16B 12/26; F16B 12/36; F16B 12/38; F16B 21/082; F16B 21/084;
(Continued)

(56) References Cited

U.S. PATENT DOCUMENTS 3,570,205 A * 3/1971 Payne .................. E04B 1/6175
52/466
3,627,362 A * 12/1971 Brenneman ........... F16B 5/0004
52/586.2
(Continued)

FOREIGN PATENT DOCUMENTS

DE 7231950 12/1972
EP 2682614 1/2014
(Continued)

OTHER PUBLICATIONS

International Search Report of corresponding PCT Application No. PCT/EP2017/068590, dated Oct. 16, 2017.

*Primary Examiner* — Patrick D Hawn
(74) *Attorney, Agent, or Firm* — Gardner Linn

(57) ABSTRACT

A connector assembly for connecting articles to one another including a male connector insertable into a substantially U shaped receiving channel defined by a respective female connector, the female connector being adapted to be located in a receiving recess formed, in use, in one of at least two articles to be connected together, the receiving recess including a pair of diverging side walls and a narrowed neck region, the neck region defining an opening of the receiving recess, at least one pair of opposing inwardly facing shoulders being defined in the side walls of the receiving recess, outer sides of the female connector including cooperating projections adapted to engage the opposing shoulders of the receiving recess when the female connector is inserted into the receiving recess to retain the female connector in the receiving recess.

15 Claims, 19 Drawing Sheets

(51) Int. Cl.
*F16B 12/24* (2006.01)
*F16B 12/36* (2006.01)

(58) Field of Classification Search
CPC ...... F16B 5/002; F16B 5/0004; F16B 5/0024;
F16B 5/0614; F16B 19/002; F16B
19/004; Y10T 403/559; Y10T 403/55;
A47B 2230/0062
See application file for complete search history.

(56) References Cited

U.S. PATENT DOCUMENTS

| | | | | |
|---|---|---|---|---|
| 3,732,659 | A * | 5/1973 | LaBarge | E04B 1/6803 52/461 |
| 3,760,547 | A | 9/1973 | Brenneman | |
| 3,999,356 | A * | 12/1976 | Packman | F16B 2/241 403/282 |
| 4,333,284 | A * | 6/1982 | Meadows | E06B 3/7001 160/179 |
| 5,694,730 | A * | 12/1997 | Del Rincon | E04B 1/6154 403/298 |
| 5,758,987 | A * | 6/1998 | Frame | F16B 21/082 403/298 |
| 5,771,650 | A * | 6/1998 | Williams | E04B 2/08 24/DIG. 41 |
| 6,036,398 | A * | 3/2000 | Theodorou | E04F 11/181 403/290 |
| 6,152,667 | A * | 11/2000 | LeVey | F16B 21/183 411/339 |
| 6,186,698 | B1 * | 2/2001 | Knapp | F16B 5/002 403/326 |
| 6,617,009 | B1 * | 9/2003 | Chen | B29C 48/001 428/195.1 |
| 6,761,008 | B2 * | 7/2004 | Chen | E04F 15/02033 52/586.1 |
| 9,714,673 | B2 * | 7/2017 | Phillips | F16B 12/24 |
| 9,810,253 | B2 * | 11/2017 | Koelling | F16B 12/24 |
| 10,197,081 | B2 * | 2/2019 | Koelling | A47B 47/025 |
| 10,731,685 | B2 * | 8/2020 | Uchida | F16F 15/08 |
| 2013/0287484 | A1 * | 10/2013 | Phillips | A47B 47/0025 403/298 |

FOREIGN PATENT DOCUMENTS

| | | | |
|---|---|---|---|
| EP | 3150083 A1 * | 4/2017 | ............. F16B 12/26 |
| WO | 2012/095454 | 7/2012 | |

* cited by examiner

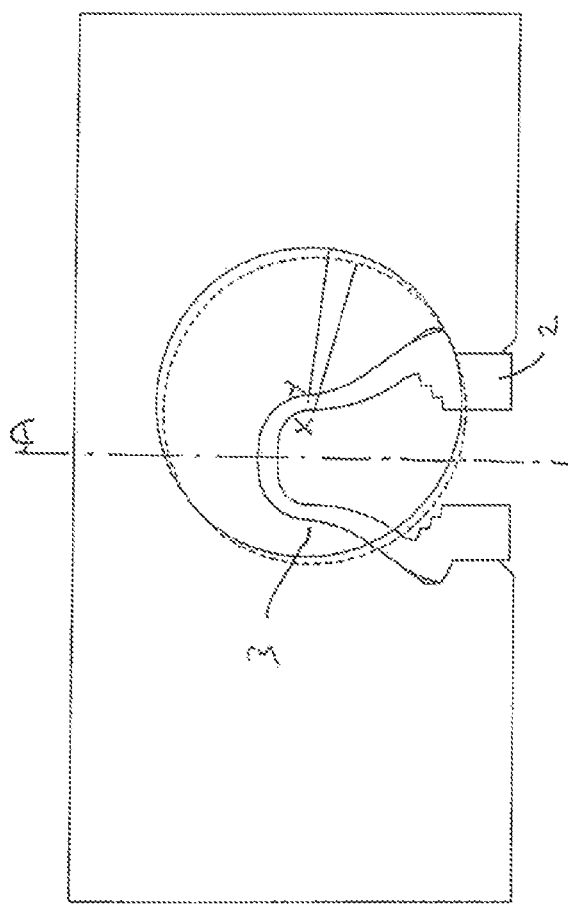

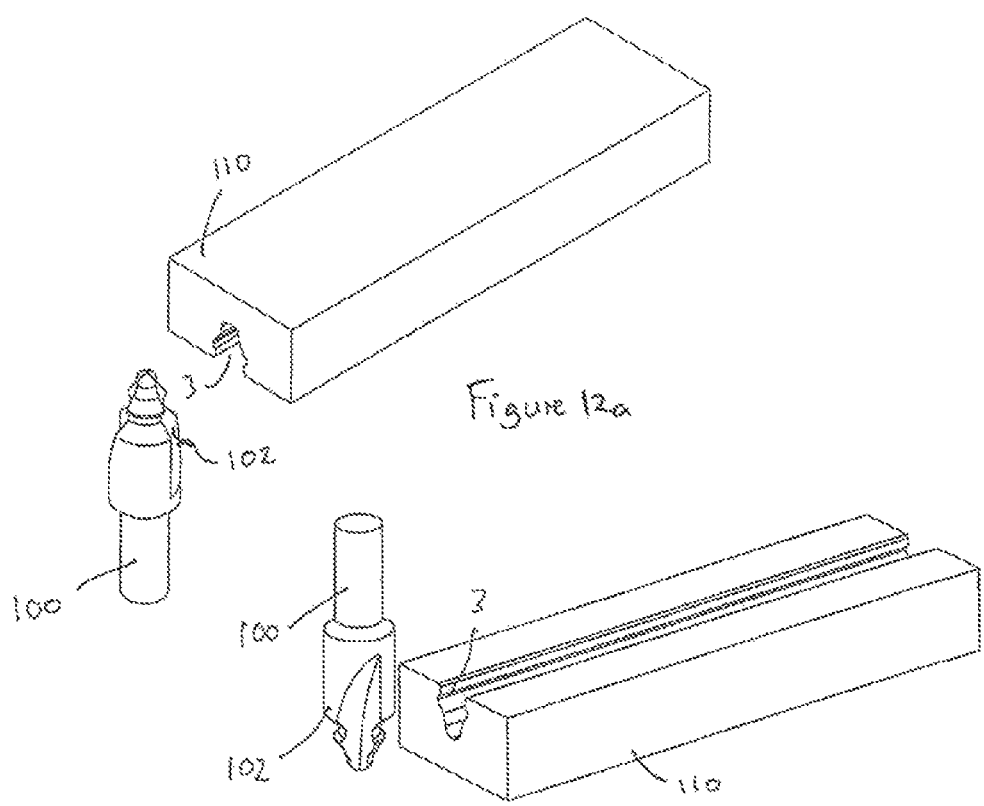

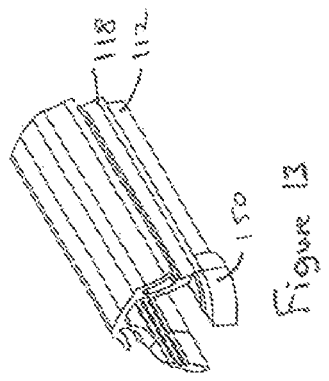
Figure 13
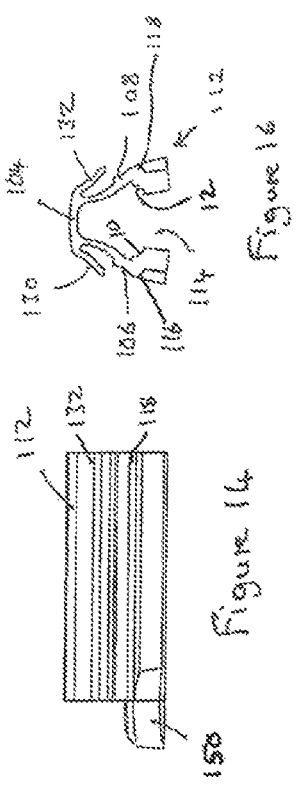
Figure 16
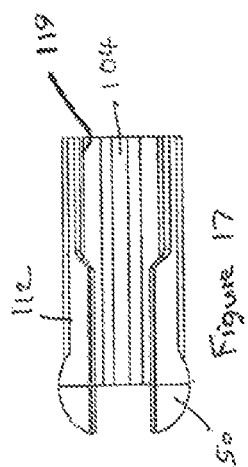
Figure 17
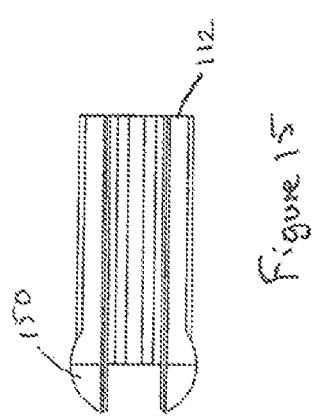
Figure 15
Figure 14

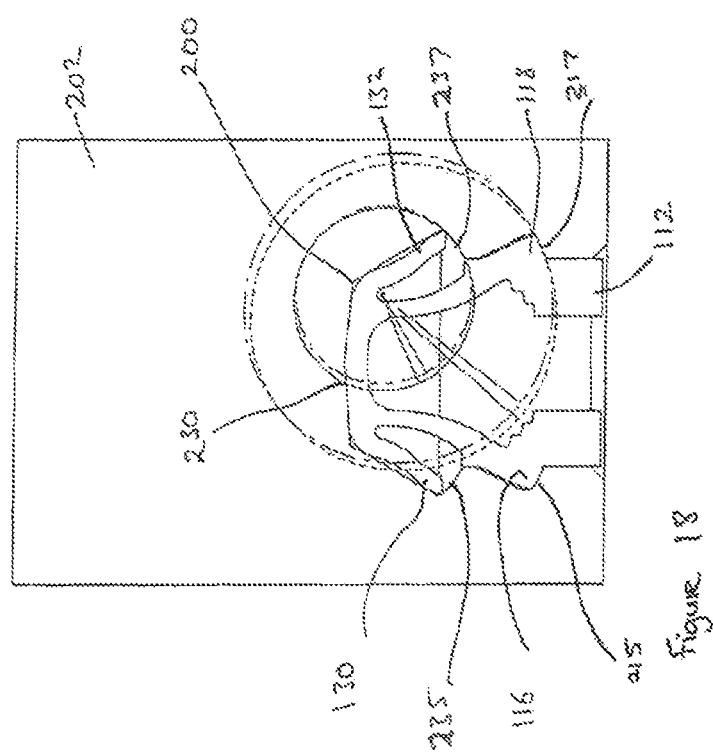

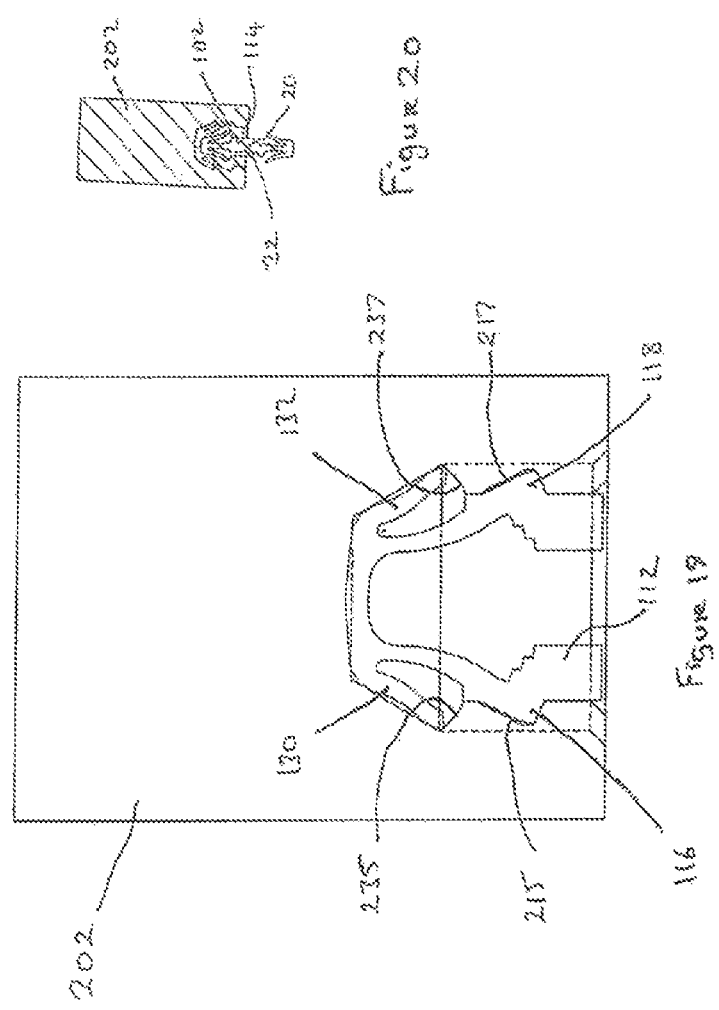

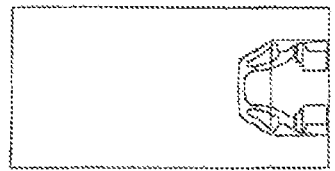
Figure 2.5
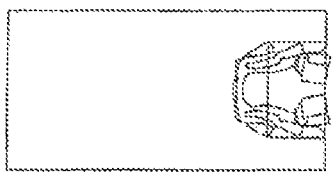
Figure 2.4
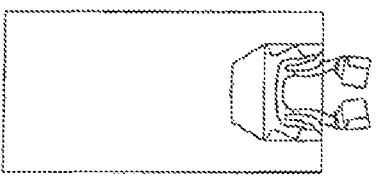
Figure 2.3
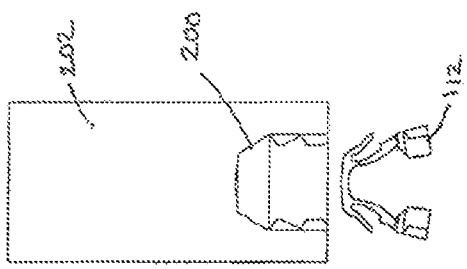
Figure 2.2
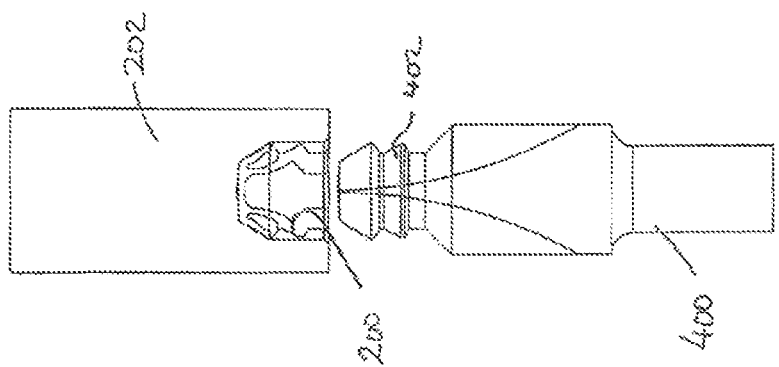
Figure 2.1

DETAIL A
SCALE 4:1

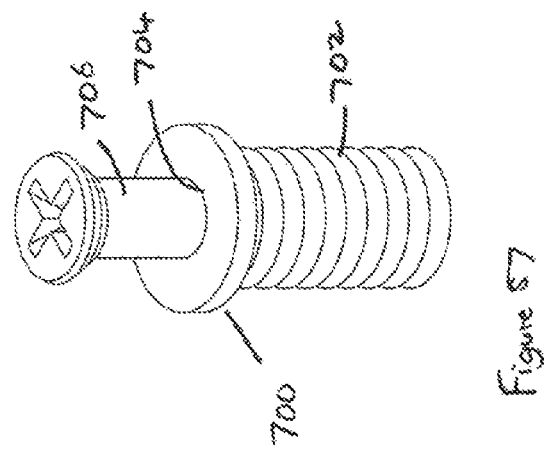
Figure 57
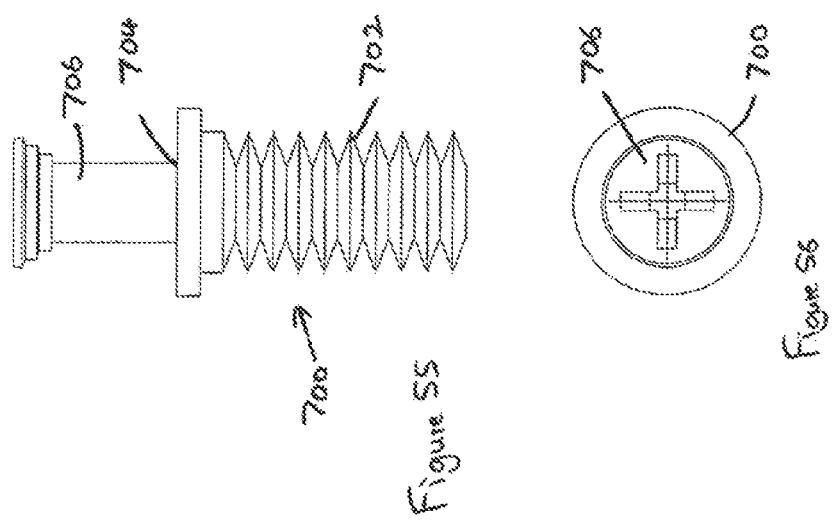
Figure 55
Figure 56

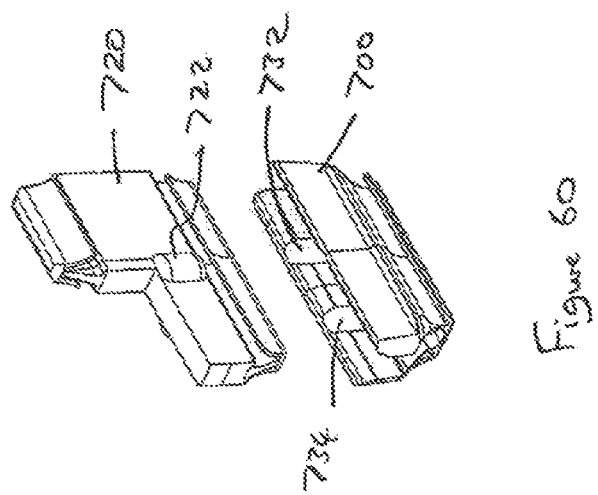
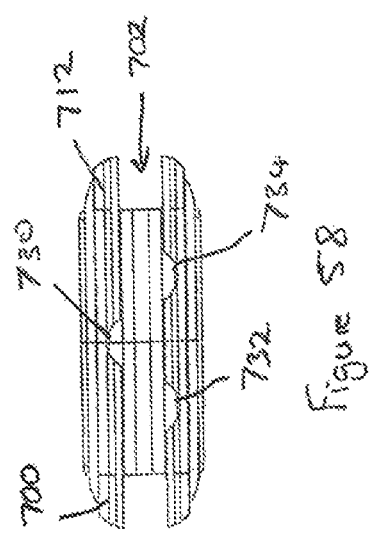
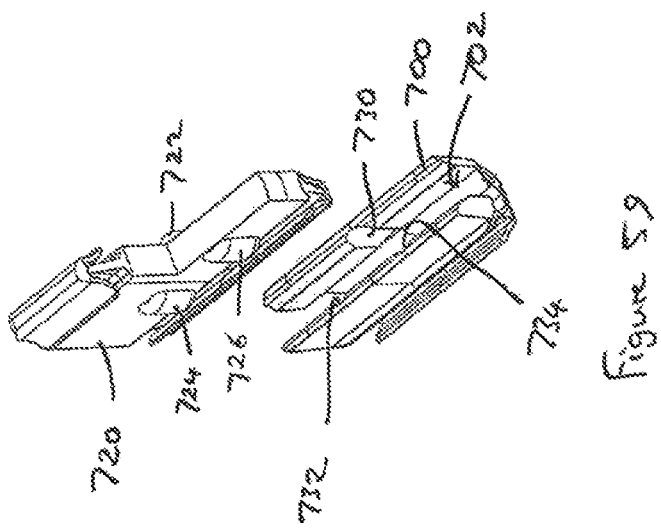

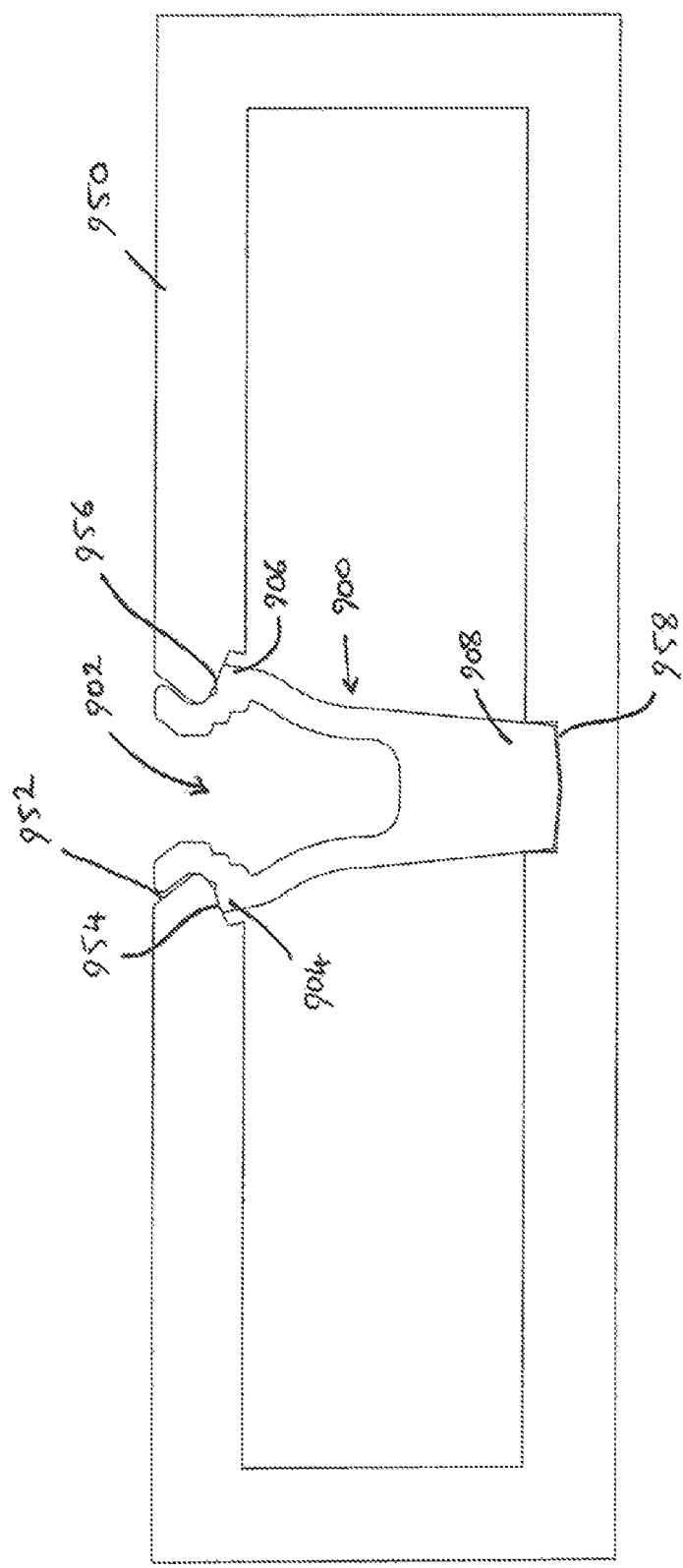

CONNECTOR ASSEMBLY

CROSS REFERENCE TO RELATED APPLICATIONS

The present application is a § 371 national stage of International Application PCT/EP2017/068590, filed Jul. 24, 2017, which claims priority benefit of U.K. Pat. Application Ser. No. 1612857.1, filed Jul. 25, 2016, both of which are hereby incorporated herein by reference in their entireties.

FIELD OF THE INVENTION

This invention relates to a connector assembly for connecting articles to one another, and in particular to a connector assembly connecting together component parts of a ready to assemble article of furniture, or for connecting numerous other objects and articles to one another.

BACKGROUND OF THE INVENTION

Ready to assemble furniture has been known in the furniture industry for many years. This type of furniture construction provides a number of advantages to the manufacturer, to the retailer, and to the customer. For example, as to the manufacturer, there are significant cost savings in manufacturing unassembled furniture over conventional fully assembled furniture. Ready to assemble furniture can be supplied flat packed, thus requiring less storage space for both the manufacturer and the retailer. The customer ultimately benefits the lower cost of ready to assemble furniture as opposed to pre-assembled furniture and the ease of transport of flat packed ready to assemble furniture.

Unlike conventional fully or pre-assembled furniture, ready to assemble furniture, as the name implies, requires assembly by the customer. This furniture often requires the use of tools by the customer to enable the manipulation of specialized fittings to assemble and secure the various components of the furniture together. The customers may not have the necessary tools or skill level to assemble the furniture properly. The failure to do so may result in the furniture being unstable, and potentially collapsing during use.

SUMMARY OF THE INVENTION

According to the present invention there is provided a connector assembly for connecting articles to one another, without the need for tools and in a simple and efficient manner, while ensuring the integrity of the resulting assembled furniture. The connector assembly includes a male connector insertable into a substantially U shaped receiving channel defined by a respective female connector, the female connector being adapted to be located in a receiving recess formed, in use, in one of at least two articles to be connected together, the receiving recess including a pair of diverging side walls and a narrowed neck region, the neck region defining an opening of the receiving recess, at least one pair of opposing inwardly facing shoulders being defined in the side walls of the receiving recess, outer sides of the female connector including cooperating projections adapted to engage the opposing shoulders of the receiving recess when the female connector is inserted into the receiving recess to retain the female connector in the receiving recess.

Optionally, the receiving recess and the female connector are symmetrical in cross section about a central plane, the angle between the shoulders of the receiving recess and the central plane being less that the angle between a cooperating face of the cooperating projections formed on the outer sides of the female connector and the central plane such that the projections engage the shoulders with a wedge effect, biasing the female connector towards the base of the receiving recess.

In one embodiment the surface of each shoulder of the receiving recess may define a portion of a respective arc centred about a first axis, the abutting surfaces of the respective cooperating projection formed on the outer sides of the female connector defining a portion of a respective arc centred about a second axis, the second axis being offset further from the central plane of the receiving recess than the first axis such that the respective projection engages its cooperating shoulder with the wedge effect.

The female connector may be formed from a resilient material such that the side walls of the female connector can be squeezed together to facilitate insertion of the female connector in the receiving recess through the narrowed neck region of the receiving recess. The transverse width of the female connector may be greater, at rest, than the width of the receiving recess such that the sides of the female connector are biased into contact with the side walls of the receiving recess when the female connector is inserted into the receiving recess.

The inner sides of the receiving channel defined by the female connector may comprise a pair of diverging side faces extending from a base of the receiving channel and a narrowed neck region, a pair of opposing shoulders being defined between the diverging side faces and narrowed neck region, the at least one retaining member of the male connector having at least one rib extending outwardly from an enlarged base region of the male connector and terminating in a head region, a pair of symmetrically arranged outwardly flared resilient wings having a substantially arrow head shaped cross section extending from the head region towards the base region on either side of the at least one rib, whereby the resilient wings of the at least one retaining member of the male connector are adapted to engage the opposing shoulders of the female connector when the retaining member of the male connector is inserted into the female connector to retain the male connector in engagement with the female connector. The base portion of the male connector may be adapted to be located within the narrowed neck region of the female connector when the connecting portion of the male connector is inserted into the receiving channel thereof such that the base portion prevents the sides of the receiving channel defined by the female connector from being displaced towards one another, thereby retaining the female connector within the receiving recess.

In one embodiment the surface of each shoulder defined on the inner sides of the receiving channel defined by the female connector for cooperating with the resilient wings of the male connector is corrugated to enhance engagement of the ends of the wings with the shoulders.

Each male connector may be a double headed connector, having a respective central rib and pair of wings extending on either side of the base region, whereby each end of the connector can be received within a respective female connector.

In an alternative embodiment the male connector may comprise a single rib extending from the base region having a pair of wings for retaining the male connector in a respective female connector, the base region being integrally formed with or adapted to be connected or bonded to another component.

In one embodiment the outer sides of the female connector may incorporate resilient outwardly diverging wings extending from the base of the female connector towards the neck region adapted to engage cooperating shoulders form in the side walls of the receiving recess.

An enlarged end portion may be defined at at least one end region of each side wall of the female connector arranged to be received within a correspondingly shaped region of the receiving recess to constrain movement of the female connector within the receiving recess along the axis of the receiving recess.

These and other objects, advantages and features of the invention will become apparent upon review of the following specification in conjunction with the drawings.

BRIEF DESCRIPTION OF THE DRAWINGS

Embodiments of the present invention will now be described by way of example only, with reference to the accompanying drawings, in which:—

FIG. 6 is a detailed view of the female connector of FIG. 1 located in a receiving recess in an item;

FIGS. 12a and 12b are further perspective views showing the tool used for creation of the cooperating receiving recess for receiving the female connector of FIG. 1;

FIG. 13 is a perspective view of a female connector of a connector assembly according to a second embodiment of the present invention;

FIG. 14 is a side view of the female connector of FIG. 13;

FIG. 15 is a plan view of the female connector of FIG. 13 from below;

FIG. 16 is an end view of the female connector of FIG. 13;

FIG. 17 is a plan view from below of a modified female connector;

FIG. 18 is a detailed view of the female connector of FIG. 13 located in a cooperating receiving recess in an item;

FIG. 19 is a further detailed view of the female connector of FIG. 13 located in a cooperating receiving recess in an item;

FIG. 20 illustrates the female connector of FIG. 13 and the cooperating male connector of the second embodiment of the present invention, in use;

FIG. 21 illustrates a tool used to create a cooperating receiving recess for the female connector of FIG. 13;

FIGS. 22 to 25 illustrate the insertion of the female connector of FIG. 13 into a cooperating receiving recess in an item;

FIGS. 55 to 57 illustrate a dowel suitable for use with the female connector of FIGS. 43 to 47 for insertion of a screw;

FIGS. 58 to 60 illustrate a modified connector assembly in accordance with a further embodiment of the present invention adapted so that the male connector can only be inserted into the female connector in a specific orientation;

FIG. 61 is a sectional view of a female connector in accordance with a further embodiment of the present invention modified to fit into a hollow core panel.

DESCRIPTION OF THE PREFERRED EMBODIMENTS

Figure 1:
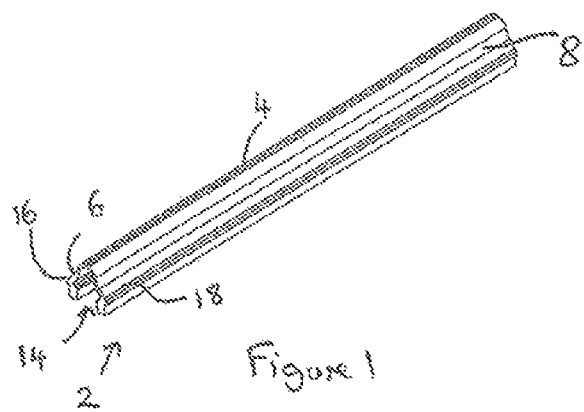
FIG. 1 is a perspective view of a female connector of a connector assembly according to a first embodiment of the present invention.

A connector assembly for coupling objects together, for example for components 2 of a ready to assemble article of furniture, in accordance with a first embodiment of the present invention is illustrated in FIGS. 1 to 12*b*.

The connector assembly includes one or more female connectors 2, each includes an elongate U-section member defining a receiving channel for receiving a portion of a cooperating male connector, the female connector 2 being adapted to be inserted into a cooperating receiving recess 3 in a face of at least one of two components to be coupled together. The outer sides of the female connector 2 define retaining projections 16,18 adapted to engage a pair of opposing inwardly facing shoulders 15,17 defined in the side walls of the receiving recess 3 into which it is inserted to retain the female connector 2 therein. The shapes of the retaining projections 16,18 of the female connector 2 and the shoulders 15,17 in the receiving recess 3 are adapted to tightly secure the female connector 2 within the cooperating receiving recess 3, particularly once a male connector 20 is inserted into the female connector 2, as will be described in more detail below.

Figure 2:
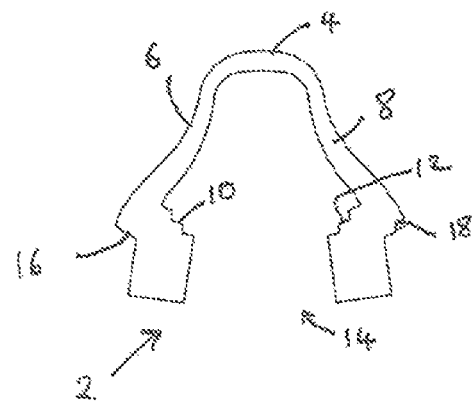
FIG. 2 is an end view of the female connector of FIG. 1.

Each female connector 2 defines a U-section receiving channel including a base 4, a pair of outwardly diverging side walls 6,8 extending from the base 4, the side walls being shaped to define a pair of opposing shoulders 10,12 on the inner faces of the female connector, facing towards the base 4, and to define the retaining projections 16,18 on the outer faces of the side walls of the female connector 2, the side walls defining a narrow neck region 14 at the open side of the receiving channel defined by the female connector 2 adjacent the shoulders 10,12. As shown in FIG. 2, the portions of the side walls defining the shoulders 10,12 on the inner faces of the side walls 6,8 also define the retaining projections 16,18 on the outer faces of the side walls 6,8.

The side walls 6,8 diverge outwardly such that the overall width of the female connector 2 at rest is wider than the cooperating receiving recess 3 into which it is to be received, such that the resilience of the material forming the female connector 2 provides an outward biasing force between the side walls 6,8 of the female connector 2 and the walls of the receiving recess 3.

Figure 3:
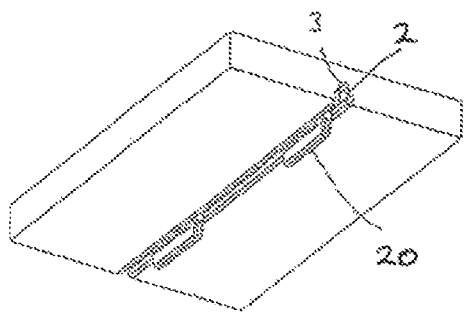
FIG. 3 is a perspective view of the connector assembly of the first embodiment of the invention in use.
Figure 4:
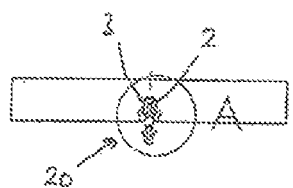
FIG. 4 is an end view of the connector assembly of FIG. 3.
Figure 5:
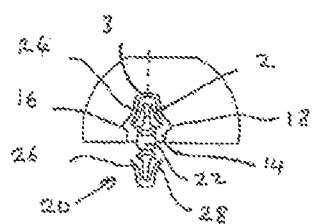
FIG. 5 is a detailed view of region A of the connector assembly of FIG. 3.

A shown in FIGS. 3 to 5, the connector assembly may also comprise a male connector member 20 having an elongate body having a base region 22, at least one central rib 24 extending outwardly from the base region 22, a distal end of the or each central rib 24 supporting a respective pair of outwardly flared symmetrically arranged resilient wings 26,28 on either side thereof, the wings 26,28 extending towards the base region 22, each pair of resilient wings 26,28 having a substantially arrow head shaped cross section extending on either side of the central rib 24. Each wing 26,28 is curved in an outwards direction away from the respective central rib 24 from the base region 22 to the free ends of the wings 26,28.

In the embodiment shown in FIGS. 3 to 5 each male connector 20 is a double headed connector, having a respective central rib 24 and pair of wings 26,28 extending on either side of the base region 22, whereby each end of the connector can be received within a respective female connector 2. Alternatively the male connector 20 may have a single rib 24 extending from the base region 22 having a pair of wings 26,28 for retaining the male connector 20 in a respective female connector 2, the base region 22 being integrally formed with or connected or bonded to another component.

The resilient wings 26,28 of the male connector 20 are resiliently displaceable towards to the respective central rib 24 to enable the wings 26,28 to pass through the narrowed neck region 14 of the respective female connector member 2, the ends of the resilient wings 26,28 engaging the shoulders 10,12 of the respective female connector 2 once the male connector 20 has been inserted therein to retain the male connector 20 therein.

The outward curvature of each resilient wing 26,28 ensures that the connector assembly resists any forces attempting to pull the connector assembly apart, such forces causing the wings 26,28 to bend outwardly, ensuring that the ends of the wings 26,28 remain firmly located behind the respective shoulders 10,12 of the female connector 2. The curvature provides a resilience to the wings 26,28 such that the male connector 20 is effectively spring loaded within the respective female connector 2.

The surfaces of the shoulders 10,12 may be corrugated to enhance engagement of the ends of the wings 26,28 with the shoulders 10,12 and to compensate for dimensional tolerances between the receiving recess 3 and the female and male connectors 2,20.

As discussed above, the base region 22 of the male connector 20 is dimensioned to be received within the neck region 14 of the receiving aperture defined by the female connector 2 when the male connector 20 is inserted into the female connector 2, serving to retain the female connector 2 within its receiving slot by preventing the side walls 6,8 of the female connector 2 from being displaced towards one another, as illustrated in FIG. 5. By contrast, before the male connector 20 is inserted into the female connector 2, the side walls 6,8 of the female connector 2 can be squeezed together, allowing the retaining projections 16,18 to be squeezed through a narrow neck region 5 of the receiving recess 3, before the side walls 6,8 of the female connector 2 spring back and the retaining projections 16,18 engage the respective shoulders 15,17 formed in the sides of the receiving recess 3 to retain the female connector 2 within the respective receiving recess 3.

As best illustrated in FIG. 6, the receiving recess 3 and the female connector 2 are symmetrical in cross section about a central axially extending plane A, the angle between the shoulders 15,17 of the receiving recess 3 and the central plane A being slightly less that the angle between a cooperating face of the cooperating projections 16,18 formed on the outer sides of the female connector 2 and the central plane A such that the projections 16,18 engage the shoulders 15,17 with a wedge effect, biasing the female connector 2 inwardly towards the base of the receiving recess 3.

In the embodiment shown in FIG. 6, the surface of each shoulder 15,17 of the receiving recess defines a portion of a respective arc centred about a respective first axis X, the abutting surfaces of the respective cooperating projection 16,18 formed on the side walls 6,8 of the female connector 2 defining a portion of a respective arc centred about a second axis Y, the second axis Y being offset further from the central plan A of the receiving recess 3 than the first axis X such that the respective projection 16,18 engages its cooperating shoulder 15,17 with the wedge effect. The wedge effect causes any tolerance between the female connector 2 and the receiving recess 3 to be taken up when the male connector 20 is inserted into the female connector 2, preventing any looseness in the assembly, in use.

Figure 7:
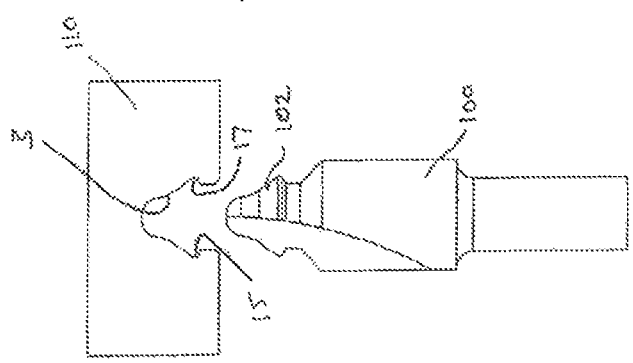
FIG. 7 illustrates a tool used to create a cooperating receiving recess for the female connector of FIG. 1.

As illustrated in FIG. 7, a cutting tool 100 may be provided for cutting the receiving recess 3 into an item 110 to be joined. The cutting tool 100 has a cutting head 102 shaped to define the base, side walls, shoulders 15,17 and neck region 5 of the receiving recess 3 as the tool 100 is traversed in a straight line across the item. The initial point at which the cutting head 102 is axially moved into the surface of the item may define an enlarged end portion at one end region the receiving recess 3. The female connector 2 may include a corresponding enlarged end region adapted to be received within the enlarged end region of the receiving recess to constrain movement of the female connector 2 within the receiving recess 3 along the axis of the receiving recess. Alternatively the cutting tool 100 may traverse across the item 110 from one side edge thereof, as shown in FIGS. 12*a* and 12*b*.

Figure 11:
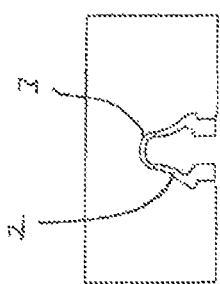
FIGS. 8 to 11 illustrate the insertion of the female connector of FIG. 1 into a cooperating receiving recess in an item.
Figure 10:
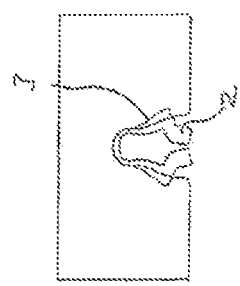
Figure 9:
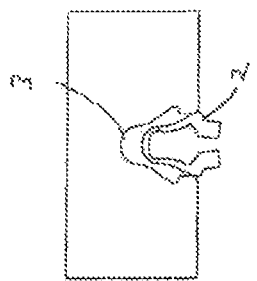
Figure 8:
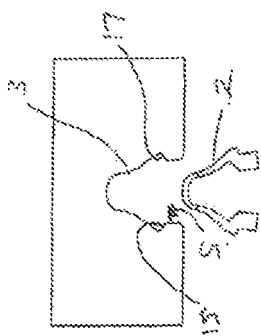

FIGS. 8 to 11 illustrate the insertion of a female connector 2 into a receiving slot 3 in the surface of an item 110. The female connector 2 is pushed into the open neck region 5 of the receiving recess, such that the side walls of the neck region 5 act against the side walls 6,8 of the female connector 2, squeezing them together until the projections 16,18 can pass through the neck region 5 of the receiving recess 3, as shown in FIGS. 9 and 10. A blade like tool (not shown) may be provided for pushing the female connector 2 into the receiving recess 3, the tool having a narrow blade portion adapted to enter into the receiving channel defined by the female connector 2, the blade portion being sufficiently narrow to pass through the narrowed neck region 14 of the female connector 2 even when the side walls 6,8 of the female connector 2 have been squeezed together sufficiently to allow the projections 16,18 to pass through the neck region 5 of the receiving recess 3. As shown in FIG. 11, once the female connector 2 has been pushed sufficiently into the receiving recess the side walls 6,8 of the female connector 2 may spring outwardly such that the projections 16,18 of the side walls 6,8 of the female connector 2 engage the shoulders 15,17 of the recess 3. Subsequently a male connector 20 may be inserted into the female connector 2 such that the resilient wings 26,28 of the male connector engage the shoulders 10,12 of the inners sides of the female connector 2. At the same time, the base region 22 of the male connector wedges into the neck region 14 of the female connector 2, pushing the side walls 6,8 of the female connector 2 tighter against the sides of the receiving recess 2. The wedge effect between the projections 16,18 of the outer sides of the side walls 6,8 of the female connector 2 and the shoulders 15,17 of the receiving recess 3 urges the female connector 2 inwardly within the receiving recess 3, creating a tight fit between the male connector 20, female connector 2 and receiving recess 3.

This arrangement allows components, such as adjacent panels of a ready to assemble article of furniture, to be fitted together in a tightly fitting snap fit manner without the use of tools.

Where a stronger retention of the female connector within the receiving slot is required a more complex design of female connector may be used, as illustrated in FIGS. 13 to 27.

In this modified female connector 112, the side walls 106,108 incorporate resilient outwardly diverging wings 130,132, similar in design to the outwardly diverging wings 26,28 of the male connector 20, extending from the base 104 of the female connector 112 towards a narrowed neck region 114, as well as a pair of projections 116,118, similar to those of the female connector 2 of the first embodiment.

As best shown in FIG. 17, a portion of the receiving channel of the female connector 112 may have a widened opening 119 to permit insertion of a male connector 20 therethrough, the male connector 20 subsequently being slid transverse to the female connector 112 to engage the male 20 connector in the neck region 114 of the female connector 112, with the base region 22 of the male connector located in the neck region 112 of the female connector 112 and the wings 26,28 of the male connector 20 engaged with the shoulders of the female connector 112.

In order to create a tighter join between the female connector 112 and the male connector 20, the surfaces of the shoulders 10,12 of the female connector 112 may be ramped such that the distance between the shoulders 10,12 and the base 104 of the female connector 112 decreases away from the opening 119, thereby pulling the male connector 20 into the female connector 112 as it is slid transverse to the female connector 112 following insertion through the opening 119.

As illustrated in FIGS. 18 to 27, the receiving recess 200 in the object 202 in which the female connector 102 is housed includes a first opposing pair of shoulders 215,217 adjacent the open side of the receiving recess 200 into which the retaining projections 116,118 defined on the sides walls 106,108 of the female connector 102 are received and may included a second pair of shoulders 235,237 adjacent a base 230 of the receiving recess 200 adapted to receive the wings 130,132 of the female connector 102.

The outward curvature of each resilient wing 130,132 ensures that the connector assembly resists any forces attempting to pull the connector assembly apart, such forces causing the wings 130,132 to bend outwardly, ensuring that the ends of the wings 130,132 remain firmly located behind the respective shoulders of the receiving recess within which the female connector 102 is mounted.

As with the first embodiment of the invention, the shapes of both sets of shoulders 215,217 and 235,237 of the receiving recess 200 and the shape of the cooperating projections 116,118 and the wings 130,132 of the female connector 112 may be adapted to define a wedge effect between the cooperating regions of the female connector 112 and the shoulders 215,217,235,237, biasing the female connector 112 into tight engagement with the receiving recess 200. This may be achieved by forming the shoulders and projections as portions of a respective arc and arranging the respective centres of the arcs of the shoulders with those of the projections and the centre of arc defining the wings 130,132 offset from the centre plane of the receiving recess/female connector by different amounts, as described in relation to the first embodiment.

Figure 26:
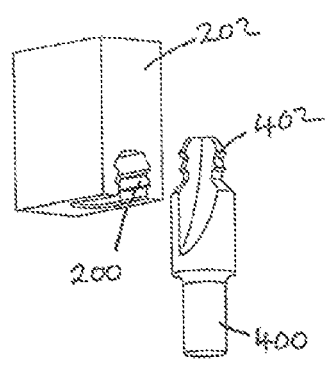
FIGS. 26 and 27 are further perspective views showing the tool used for creation of the cooperating receiving recess for receiving the female connector of FIG. 13.
Figure 27:
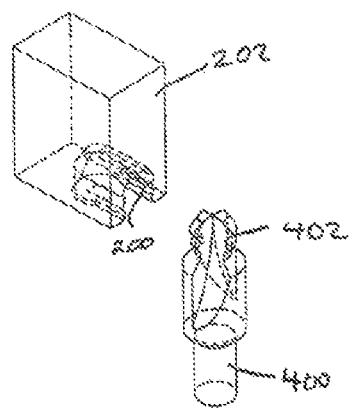
Figure 34:
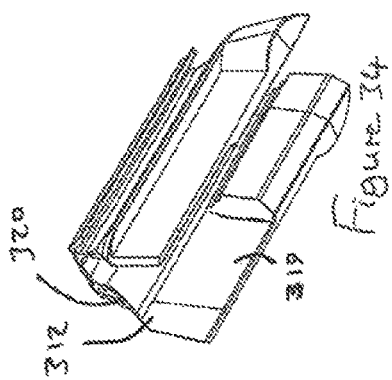
FIGS. 28 to 35 are views of a modified female connector in accordance a further embodiment of the present invention.
Figure 35:
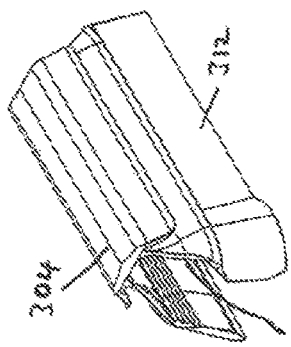
Figure 33:
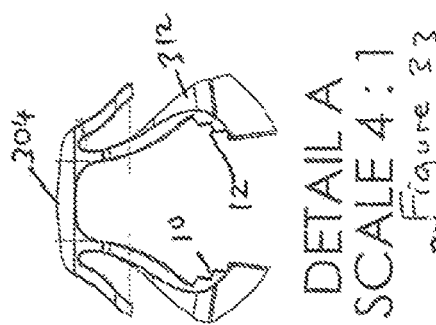
Figure 32:
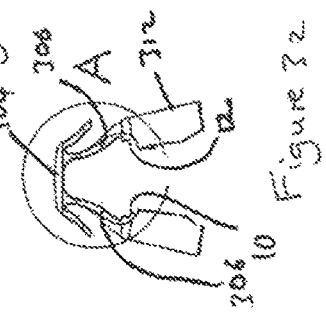
Figure 28:
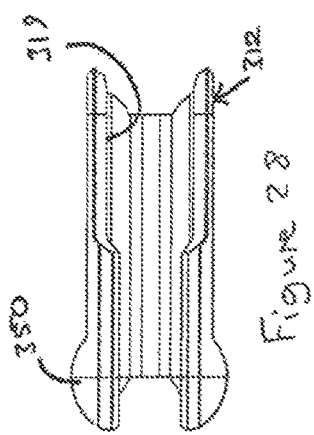
Figure 30:
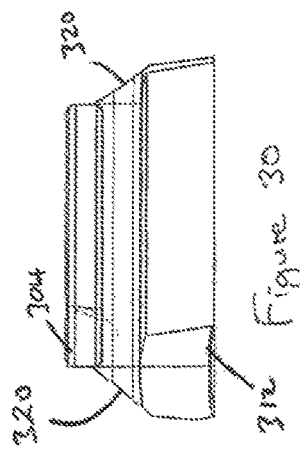
Figure 31:
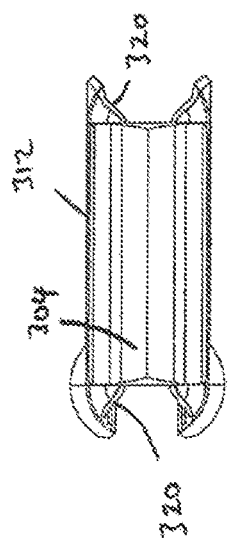
Figure 29:
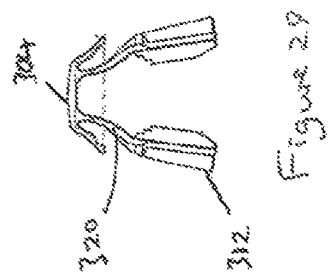
Figure 41:
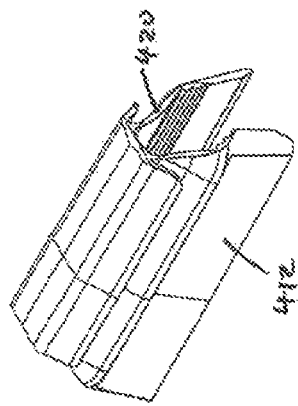
FIGS. 36 to 42 are views of a modified female connector in accordance with a further embodiment of the present invention.
Figure 42:
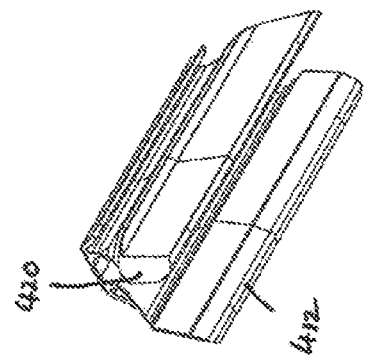
Figure 40:
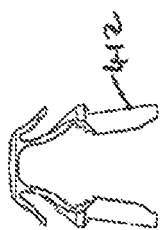
Figure 36:
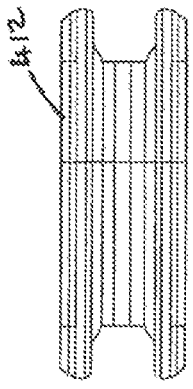
Figure 37:
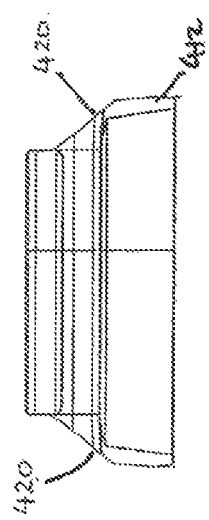
Figure 38:
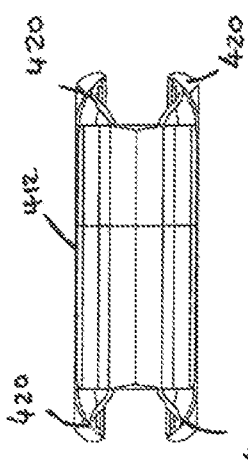
Figure 39:
Figure 47:
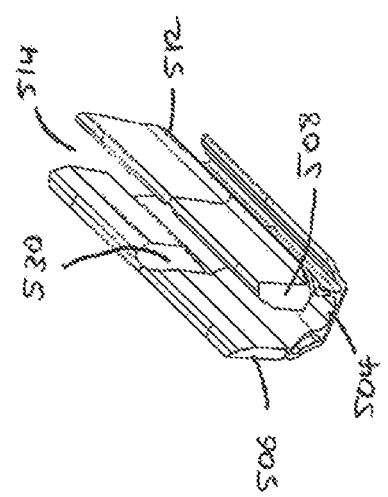
FIGS. 43 to 47 are views of a modified female connector adapted to receive a dowel as a male connector member.
Figure 43:
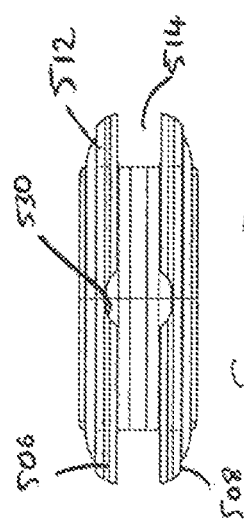
Figure 44:
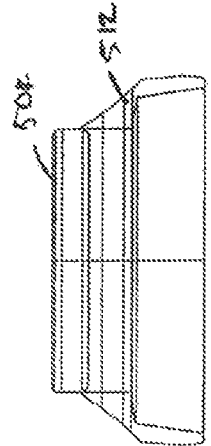
Figure 45:
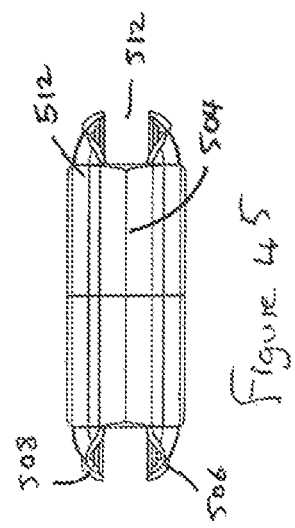
Figure 46:
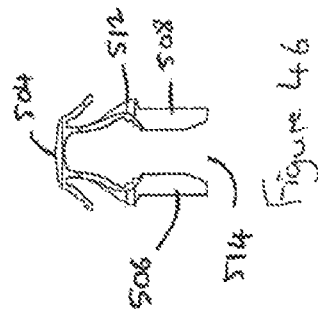

A modified tool 400, shown in FIGS. 21, 26 and 27 may be provided for cutting the receiving recess 200 in a face of an item 202 to be coupled to another by the connector assembly. The cutting head 402 is shaped to cut both sets of shoulders 215,217,235,237 in the sides of the receiving recess as the tool is traversed across the item in a straight line.

As best illustrated in FIG. 19, the innermost pair of shoulders 235,237 in the sides of the receiving recess 200 are deeper/wider than the outermost pair of shoulders 215, 217 to provide greater support for the innermost shoulders 235,237.

FIGS. 22 to 25 illustrate how the resilient side walls 106,108 of the female connector 112 may be squeezed together to allow the female connector 112 to be inserted through the narrow open neck region of the receiving recess 200, insertion of the male connector 20 into the female connector 102 subsequently preventing removal of the female connector 112 from its receiving recess 200 by virtue of the location of the base region 22 of the male connector 20 in the narrowed neck region 114 of the female connector 112.

To laterally constrain the female connector 112 within the receiving recess 200 in the object 202 within which it is fitted an enlarged substantially circular end portion 150 is provided at at least one end region of each side wall 106,108 of the female connector 102 arranged to be received within a correspondingly shaped region of the receiving recess 200.

In the embodiment shown in FIGS. 28 to 35, the side walls 306,308 of the female connector 312 have sloping ends 320, the receiving recess into which the female connector 312 is to be received having correspondingly sloping end walls, such sloping ends 320 of the female connector cooperating with the corresponding sloping end walls of the receiving recess to facilitate centring of the female connector 312 within the receiving recess. As with the embodiment shown in FIGS. 13 to 17, an opening 319 may be provided in a portion of the receiving channel of the female connector 312 to facilitate insertion of a male connector into the receiving channel, the male connector then being slid transverse to the female connector 312 to engage the wings of the male connector behind the shoulders 10,12 of the female connector 312 in the narrowed neck region 314 of the receiving channel. Again, the shoulders 10,12 of the female connector 312 may be ramped to draw the male connector into the female connector 312 as it is slid transversely away from the opening 319 into its operative position.

In the embodiment shown in FIGS. 36 to 42, the circular end portions of the female connector 412 are omitted, whereby the sloping ends 420 of the female connector 412 serve to centre the female connector 412 within its receiving recess upon insertion therein.

In a modified embodiment illustrated in FIGS. 43 to 47, a dowel entrance hole 530 is formed in the side walls 506,508, through the neck region 514 of the receiving channel of the female connector 512, extending perpendicular to the base 504 of the female connector, permitting the insertion of the dowel into the receiving channel of the female connector 512.

Figure 49:
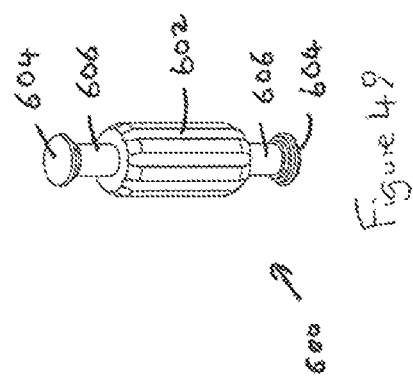
FIGS. 48 to 50 illustrate a dowel suitable for use with the female connector of FIGS. 43 to 47.
Figure 48:
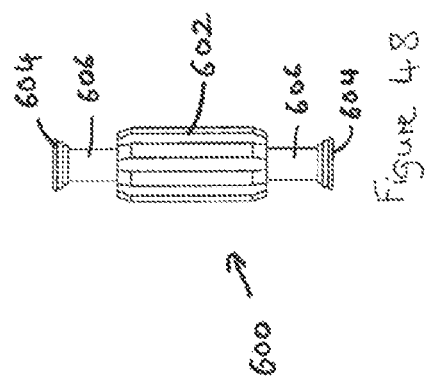
Figure 50:
Figure 54:
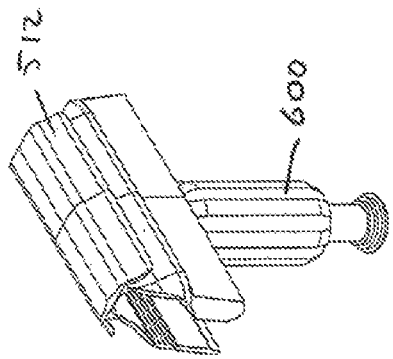
FIGS. 51 to 54 illustrate the use of the dowel of FIGS. 48 to 50 with the female connector of FIGS. 43 to 47.
Figure 52:
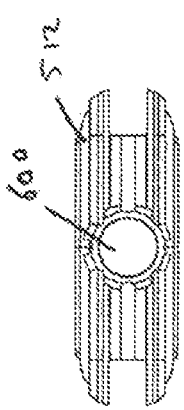
Figure 51:
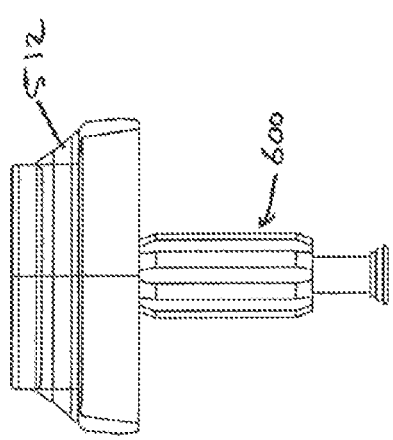
Figure 53:
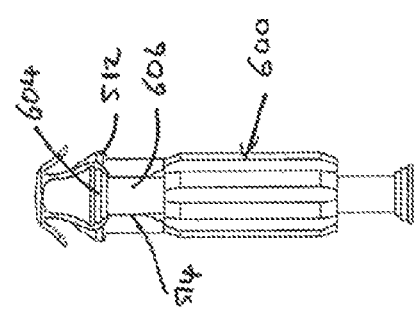

A dowel 600 adapted for insertion into the dowel entrance hole 530 of the female connector of FIGS. 43 to 47 is illustrated in FIGS. 48 to 50. The dowel 600 has a central body portion 602 and a pair of enlarged distal head portions 604 separated from the body portion by narrow neck portions 606.

As illustrated in FIGS. 51 to 54, the diameter of the neck portion 606 of the dowel 600 corresponds to the diameter of the neck region 514 of the receiving channel of the female connector 512, while the dimensions and shape of each head portion 604 is adapted to engage the shoulders 10,12 of the female connector 512 to retain the dowel 600 within the receiving channel of the female connector. The diameter of the dowel entrance hole 530 is equal to or greater than the diameter of the head portions 604 of the dowel 600 to permit insertion of the dowel 600 into the receiving channel of the female connector 512. The dowel 600 is subsequently locked into the female connector 512 by sliding the dowel laterally within the female connector 512, away from the entrance hole 530, so that the head portion 604 engages and is retained by the shoulders 10,12 of the female connector 512.

Again, the shoulders 10,12 of the female connector 512 may be ramped (i.e. not parallel to the base 504) to draw the dowel 600 into the receiving channel of the female connector 512 as it is slid away from the entrance hole 530.

The dowel 600 may have only single head portion 604 at the end of a single neck portion at one end of the body portion 602 for insertion into a female connector 512, an opposite end of the dowel body portion 602 being integrally formed with or adapted to be attached to a further article or component.

FIGS. 55 to 57 illustrate a modified dowel 700 intended to be inserted into the dowel entrance hole 530 of the female connector 512 of FIGS. 43 to 47 to allow insertion of a threaded screw into the female connector 512.

The dowel 700 has corrugated sides 702 to retain the dowel into the entrance hole 530 of the female connector 512 and a central hole 704 for receiving a screw 706.

FIGS. 58 to 60 illustrate a modified connector assembly wherein the female and male connectors are modified so that the male connector can only be inserted into the female connector in a predetermined orientation. This is achieved by forming spaced recesses 730, 732, 734 in the sides of the receiving channel 702 of the female connector 700, the recesses 732,734 in one side of the receiving channel 702 being offset from the recess 730 in the opposite side thereof neck, cooperating protrusions 724,726,728 being formed on central rib of the male connector 720, wherein, when the male connector 720 is inserted into the receiving channel 702 of the female connector 700 in the predetermined correct orientation the protrusions 724,726,728 on the male connector 720 enter into the cooperating recesses 730,732, 734. Should the user attempt to insert the male connector 720 into the female connector in an incorrect orientation, the recesses 730,732,734 and protrusions 724,726,728 will not line up and the male connector 720 will be prevented from being inserted into the receiving channel 702 of the female connector 700.

Figure 62:
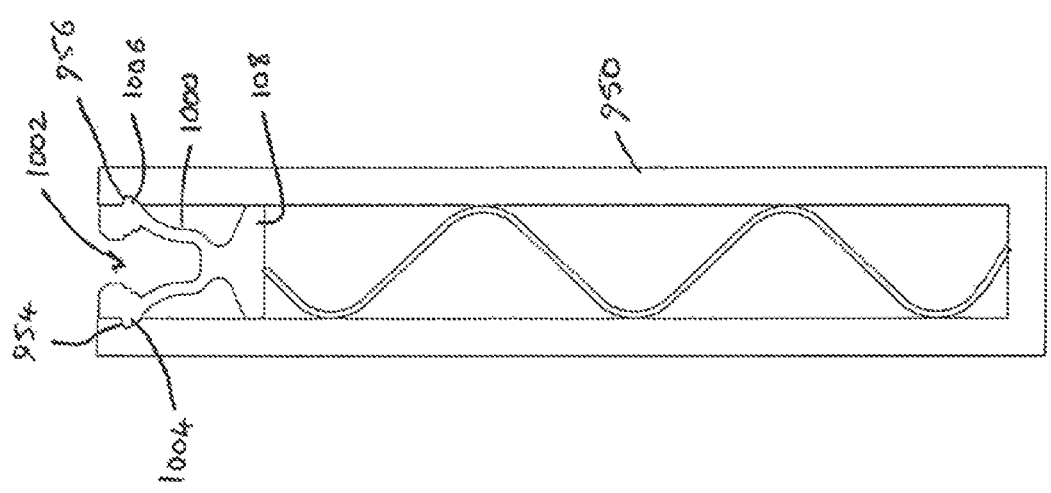
FIG. 62 is a sectional view of a female connector in accordance with a further embodiment of the present invention modified to fit into an edge of a hollow core panel.

FIGS. 61 and 62 illustrate modified female connectors for use with hollow core panels. Hollow core panels are becoming increasing popular due to their light weight and high strength compared to traditional particle board (MDF) laminated panels. Hollow core panels are also advantageous when used in environments where moisture may be a problem, such as in caravans and boats.

Hollow core panels and boards comprise face sheets around a hollow core. The hollow core may contain a paper honeycomb or corrugated sheet as reinforcement, to which the outer face sheets may be bonded. The face sheets may be relatively thin, for example 6 mm or less, leading to difficulties when using traditional fasteners, such as screws, to fasten such panels together or to other articles. However, female connectors of the connector assembly in accordance with the present invention can be modified to provide a reliable and secure means for joining such hollow core panels to one another and to other articles.

In the embodiment shown in FIG. 61, a modified female connector 900 is shown adapted to be inserted into a face of a hollow core panel 950. The female connector 900 is similar to that of the previous embodiments, including an elongate U-section member defining a receiving channel 902 for receiving a portion of a cooperating male connector, the female connector 900 being adapted to be inserted into a cooperating receiving recess 952 in a face of the hollow core panel 950. The outer sides of the female connector 900 define retaining projections 904,906 adapted to engage a pair of opposing inwardly facing shoulders 954,956 defined in a rear side of the receiving recess 952 into which it is inserted to retain the female connector 900 therein. A base 908 of the female connector 900 is enlarged to engage an opposite face of the panel 950 when the female connector 900 is inserted through the receiving recess 952. The shapes of the retaining projections 904,906 of the female connector 900 and the shoulders 954,956 in the receiving recess 952 and the dimensions of the base 908 of the female connector 900 are adapted to tightly secure the female connector 900 within the cooperating receiving recess 952, particularly once a male connector is inserted into the female connector 900 to fill the neck region of the receiving channel in the female connector 900. As illustrated in FIG. 63, a recess 958 may be formed in the opposite face of the panel for receiving the base 952 of the female connector 900 when the retaining projections 904,906 of the female connector 900 engage the shoulders 954,956 of the receiving recess 952, thereby laterally stabilising the female connector 900 within the receiving recess 952.

FIG. 62 illustrates a modified female connector 1000 adapted to be inserted into an edge of a hollow core panel 950. The female connector 1000 is once again similar to that of the previous embodiments, including an elongate U-section member defining a receiving channel 1002 for receiving a portion of a cooperating male connector, the female connector 100 being adapted to be inserted into a cooperating receiving recess 952 in an edge of the hollow core panel 950. The outer sides of the female connector 1000 again define retaining projections 1004,1006 adapted to engage a pair of opposing inwardly facing shoulders 954, 956 defined in the sides of the receiving recess 952 into which it is inserted to retain the female connector 900 therein. The base 1008 of the female connector 1000 is enlarged to engage opposite faces of the panel 950 adjacent the edge into which the female connector 1000 is inserted when the female connector 900 is inserted into the receiving recess 952. By engaging the opposite faces of the panel 950 internally of the panel 950 the enlarged head portion 1008 of the female connector 1000 laterally stabilises the female connector 100 within the receiving recess 952 in the edge of the panel 950.

While the connector assembly of the present invention has been described in relation to a ready to assemble/self assembly article of furniture, it is envisaged that such connector assembly may be utilised to interconnect a wide variety of articles, such as in automotive assemblies, or any other application where it is desired to couple to connect two articles in a rapid and reliable manner without requiring the use of tools. The connector assembly in accordance with the present invention may be used on all types of self assembly furniture wherein butting panels need to be attached to one another.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A connector assembly for connecting articles to one another, said connector assembly comprising:
   a male connector;
   a female connector defining a substantially U shaped receiving channel and having outer sides;
   at least two articles to be connected together; and
   a receiving recess formed in one of said at least two articles;
   said male connector being insertable into said U shaped receiving channel;
   said female connector being adapted to be located in-a said receiving recess;
   said receiving recess comprising a pair of diverging side walls defining at least one pair of opposing inwardly facing shoulders, and a narrowed neck region that defines an opening of said receiving recess;
   said outer sides of said female connector including cooperating projections adapted to engage said opposing shoulders of said receiving recess when said female connector is inserted into said receiving recess to retain said female connector in said receiving recess;
   wherein said receiving recess and said female connector are symmetrical in cross section about a central plane, with an angle defined between said shoulders of said receiving recess and the central plane being less than an angle defined between a cooperating face of said cooperating projections of said female connector and the central plane such that said cooperating projections engage said shoulders with a wedge effect to bias said female connector towards a base of said receiving recess.

2. The connector assembly of claim 1, wherein a surface of each shoulder of said receiving recess defines a portion of a respective arc centred about a first axis, with abutting surfaces of the respective cooperating projection formed on said outer sides of said female connector defining a portion of a respective arc centred about a second axis, the second axis being offset further from the central plane of said receiving recess than the first axis such that the respective projection engages its cooperating shoulder with said wedge effect.

3. The connector assembly of claim 1, wherein said female connector is formed from a resilient material such that said side walls of said female connector can be squeezed together to facilitate insertion of said female connector in said receiving recess through said narrowed neck region of said receiving recess.

4. The connector assembly of claim 3, wherein a transverse width of the female connector is greater, at rest, than a width of said receiving recess such that said sides of said female connector are biased into contact with said side walls of said receiving recess when said female connector is inserted into said receiving recess.

5. The connector assembly of claim 1, wherein inner sides of said receiving channel defined by said female connector comprise a pair of diverging side faces extending from a base of said receiving channel and a narrowed neck region, a pair of opposing shoulders being defined between said diverging side faces and narrowed neck region, said male connector comprising at least one retaining member comprising at least one rib extending outwardly from an enlarged base region of said male connector and terminating in a head region, a pair of symmetrically arranged outwardly flared resilient wings having a substantially arrow head shaped cross section extending from said head region towards said base region on either side of said at least one rib, whereby said resilient wings of said at least one retaining member of said male connector are adapted to engage said opposing shoulders of said female connector when said retaining member of said male connector is inserted into said female connector to retain said male connector in engagement with said female connector.

6. The connector assembly of claim 5, wherein said base region of said male connector is adapted to be located within said narrowed neck region of said female connector when said retaining member of said male connector is inserted into said receiving channel thereof such that said base region prevents said sides of said receiving channel defined by said female connector from being displaced towards one another, thereby retaining said female connector within said receiving recess.

7. The connector assembly of claim 5, wherein surfaces of said inner sides of said receiving channel defined by said female connector are corrugated to enhance engagement with said male connector.

8. The connector assembly of claim 5, wherein each male connector comprises a double headed connector, having a respective central rib and pair of wings extending on either side of said base region, whereby each end of said male connector can be received within a respective one of said female connectors.

9. The connector assembly of claim 1, wherein said male connector comprises a single rib extending from said base region having a pair of wings for retaining said male connector in a respective female connector, said base region being integrally formed with or adapted to be connected or bonded to another component.

10. The connector assembly of claim 1, wherein said outer sides of said female connector incorporate resilient outwardly diverging wings extending from said base of said receiving channel of said female connector towards said neck region adapted to engage cooperating shoulders formed in said side walls of said receiving recess.

11. The connector assembly of claim 1, wherein an enlarged or tapered end portion is defined at at least one end region of each side wall of said female connector arranged to be received within a correspondingly shaped region of said receiving recess to constrain movement of said female connector within said receiving recess along the axis of said receiving recess.

12. The connector assembly of claim 1, wherein said female connector includes a wider opening in a portion of said neck region permitting insertion of a male connector therein, whereby, in use, a male connector can be inserted into said female connector through said opening and subsequently displaced laterally with respect to said female connector to retain said male connector within said female connector.

13. The connector assembly of claim 11, wherein a distance between said inwardly facing shoulders and a base of said receiving recess of said female connector reduces in a direction laterally away from said opening, urging said male connector deeper into said receiving recess of said female connector as it is displaced laterally away from said opening once inserted into said female connector.

14. An article of furniture incorporating at least one connector assembly as claimed in claim 1.

15. The connector assembly of claim 1, wherein said diverging side walls of said receiving recess are diverging apart in the direction of said narrowed neck region that defines said opening of said receiving recess.

* * * * *